US011652683B2

(12) United States Patent
Mihara et al.

(10) Patent No.: US 11,652,683 B2
(45) Date of Patent: May 16, 2023

(54) FAILURE NOTIFICATION SYSTEM, FAILURE NOTIFICATION METHOD, FAILURE NOTIFICATION DEVICE, AND FAILURE NOTIFICATION PROGRAM

(71) Applicant: Nippon Telegraph and Telephone Corporation, Tokyo (JP)

(72) Inventors: Kotaro Mihara, Musashino (JP); Toshifumi Sano, Musashino (JP); Nobuhiro Kimura, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/426,429

(22) PCT Filed: Jan. 22, 2020

(86) PCT No.: PCT/JP2020/002013
§ 371 (c)(1),
(2) Date: Jul. 28, 2021

(87) PCT Pub. No.: WO2020/162165
PCT Pub. Date: Aug. 13, 2020

(65) Prior Publication Data
US 2022/0103416 A1 Mar. 31, 2022

(30) Foreign Application Priority Data
Feb. 5, 2019 (JP) .............................. JP2019-018633

(51) Int. Cl.
*H04L 41/0816* (2022.01)
*H04L 41/12* (2022.01)
(Continued)

(52) U.S. Cl.
CPC ........ *H04L 41/065* (2013.01); *H04L 41/0645* (2013.01); *H04L 41/0672* (2013.01);
(Continued)

(58) Field of Classification Search
CPC ............... H04L 41/0645; H04L 41/065; H04L 41/0672; H04L 41/0816; H04L 41/12; H04L 43/0817
See application file for complete search history.

(56) References Cited

U.S. PATENT DOCUMENTS

2012/0311566 A1* 12/2012 Takaoka .............. G06F 11/3079 718/1
2017/0093629 A1* 3/2017 Cong .................. H04L 41/0866
(Continued)

FOREIGN PATENT DOCUMENTS

| JP | 2017135653 | 8/2017 |
| WO | WO 2017170310 | 10/2017 |
| WO | WO-2017209955 A1 * | 12/2017 | .......... G06F 11/0712 |

OTHER PUBLICATIONS

ZOHO Japan Corporation, "Life and Death Monitoring (Ping Monitoring)/Availability Monitoring," Manage Engine, retrieved on Dec. 20, 2018, retrieved from URL <https://www.manageengine.jp/products/OpManager/availability-monitoring.html>, 13 pages (With English Translation).

*Primary Examiner* — James E Springer
*Assistant Examiner* — Patrick F Ngankam
(74) *Attorney, Agent, or Firm* — Fish & Richardson P.C.

(57) ABSTRACT

A failure notification system includes a logical configuration provider which provides logical configurations in which a plurality of types of hardware are virtualized, a processor using logical configurations provided from the logical configuration provider, and a failure notifier which notifies the processor 3 of a failure in the logical configuration provider. A notifier includes a storage device 10 which stores hardware configuration data in which an ID of the hardware is associated with an ID of a logical configuration corresponding to the hardware, a logical configuration identifier which identifies a logical configuration corresponding to hardware
(Continued)

from which a failure is detected from the hardware configuration data when a failure in the hardware is detected, and a notifier which notifies the processor of occurrence of a failure in the logical configuration identified by the logical configuration identifier.

7 Claims, 8 Drawing Sheets

(51) Int. Cl.
    *H04L 43/0817*     (2022.01)
    *H04L 41/0631*     (2022.01)
    *H04L 41/0654*     (2022.01)

(52) U.S. Cl.
    CPC .......... *H04L 41/0816* (2013.01); *H04L 41/12* (2013.01); *H04L 43/0817* (2013.01)

(56) References Cited

U.S. PATENT DOCUMENTS

2017/0220454 A1     8/2017   Kano
2020/0401432 A1*  12/2020  Nakano ................. G06F 9/5044

* cited by examiner

Fig. 4

| ID OF HARDWARE | 11 HARDWARE CONFIGURATION DATA |
|---|---|
| | ID OF LOGICAL CONFIGURATION |
| ... | ... |
| ... | ... |
| ... | ... |

Fig. 6

12 REDUNDANCY TYPE DATA

| ID OF LOGICAL CONFIGURATION | REDUNDANCY TYPE |
|---|---|
| ... | ... |
| ... | ... |
| ... | ... |

Fig. 7

| ID OF LOGICAL CONFIGURATION | 13 PROCESSOR DATA ID OF PROCESSOR |
|---|---|
| ... | ... |
| ... | ... |
| ... | .. |

FAILURE NOTIFICATION SYSTEM, FAILURE NOTIFICATION METHOD, FAILURE NOTIFICATION DEVICE, AND FAILURE NOTIFICATION PROGRAM

CROSS-REFERENCE TO RELATED APPLICATIONS

This application is a National Stage application under 35 U.S.C. § 371 of International Application No. PCT/JP2020/002013, having an International Filing Date of Jan. 22, 2020, which claims priority to Japanese Application Serial No. 2019-018633, filed on Feb. 5, 2019. The disclosure of the prior application is considered part of the disclosure of this application, and is incorporated in its entirety into this application.

TECHNICAL FIELD

The present invention relates to a failure notification system including a logical configuration provider which provides logical configurations in which a plurality of types of hardware are virtualized, a processor using logical configurations provided from the logical configuration provider, and a failure notifier which notifies the processor of a failure of the logical configuration provider, a failure notification method using the failure notification system, a failure notification apparatus, and a failure notification program.

BACKGROUND ART

With the recent development of information communication systems, network functions virtualization (NFV) is becoming popular. NFV is a method of implementing functions of a network device as software (a virtual machine) on a virtualization base of a general-purpose server. In addition, systems using NFV and a virtual machine are also becoming popular. Hardware is abstracted in NFV and hardware of NFV is masked for a virtual machine using NFV.

Further, there are general cases in which hardware has an ACT/SBY system switching function. Middleware operating on hardware includes a failure control logic which detects a failure of the hardware, and when a currently operating system has difficulty continuing operation, it switches the system to another system.

As a failure detection method, there are a method of confirming whether hardware has failed according to presence or absence of a response to a PING command (refer to Non Patent Literature 1, for example), a method of monitoring normality of a disk by performing read/write from/to the disk, and the like.

CITATION LIST

Non Patent Literature

[NPL 1] ManageEngine, "*Sikatukansi* (ping Kansi)•*Kayouseikansi* (Alive monitoring (ping monitoring), availability monitoring)", [online], [retrieved Jan. 25, 2019], Internet <URL:https://www.manageengine.jp/products/OpManager/availability-monitoring.html>

SUMMARY OF THE INVENTION

Technical Problem

However, since hardware of NFV is masked for a virtual machine using NFV, it is difficult for the virtual machine to directly ascertain a failure of the hardware.

The virtual machine ascertains a logical configuration but cannot ascertain a hardware configuration of NFV and thus cannot confirm a failure of each type of hardware.

In this manner, in a processor using a logical configuration in which a plurality of types of hardware are virtualized, a failure in the logical configuration cannot be appropriately detected.

Accordingly, an object of the present invention is to provide a failure notification system, a failure notification method, a failure notification apparatus, and a failure notification program which can appropriately detect a failure in logical configurations in a processor using the logical configurations in which a plurality of types of hardware are virtualized.

Means for Solving the Problem

To accomplish the object, a first feature of the present invention pertains to a failure notification system including: a logical configuration provider which provides logical configurations in which a plurality of types of hardware are virtualized; a processor using logical configurations provided from the logical configuration provider; and a failure notifier which notifies the processor of a failure in the logical configuration provider. In the failure notification system according to the first feature of the present invention, the failure notifier includes: a storage device which stores hardware configuration data in which an identifier (ID) of the hardware is associated with an ID of a logical configuration corresponding to the hardware; a logical configuration identifier which identifies a logical configuration corresponding to hardware from which a failure is detected from the hardware configuration data when a failure in the hardware is detected; and a notifier which notifies the processor of occurrence of a failure in the logical configuration identified by the logical configuration identifier.

The storage device may further store logical configuration topology data representing connection states of the logical configurations, and redundancy type data in which IDs of the logical configurations are associated with redundancy types of the logical configurations, the logical configuration identifier may further identify logical configurations influenced by the hardware from which the failure is detected and details of the influence with reference to the logical configuration topology data and the redundancy type data, and the notifier may further notify of the identified details of the influence.

The storage device may further store processor data in which the IDs of the logical configurations are associated with IDs of processors using the logical configurations, and the notifier may notify a processor using a logical configuration identified by the logical configuration identifier of occurrence of a failure in the logical configuration.

A second feature of the present invention pertains to a failure notification method used in a failure notification system including: a logical configuration provider which provides logical configurations in which a plurality of types of hardware are virtualized; a processor using logical configurations provided from the logical configuration provider; and a failure notifier which notifies the processor of a failure in the logical configuration provider. The failure notification method according to the second feature of the present invention includes: a step in which a computer stores, in a storage device, hardware configuration data in which an ID of the hardware is associated with an ID of a logical configuration corresponding to the hardware; a step in which the computer identifies a logical configuration corresponding to hardware from which a failure is detected from the hardware configuration data when a failure in the hardware is detected; and a step in which the computer notifies the processor of occurrence of a failure in the logical configuration identified in the identifying step.

A third feature of the present invention pertains to a failure notification apparatus serving as a failure notifier in a failure notification system including: a logical configuration provider which provides logical configurations in which a plurality of types of hardware are virtualized; a processor using logical configurations provided from the logical configuration provider; and the failure notifier which notifies the processor of a failure in the logical configuration provider. The failure notification apparatus according to the third feature of the present invention includes: a storage device which stores hardware configuration data in which an ID of the hardware is associated with an ID of a logical configuration corresponding to the hardware; a logical configuration identifier which identifies a logical configuration corresponding to hardware from which a failure is detected from the hardware configuration data when a failure in the hardware is detected; and a notifier which notifies the processor of occurrence of a failure in the logical configuration identified by logical configuration identifier.

A fourth feature of the present invention pertains to a failure notification program for causing a computer to serve as the failure notification apparatus according to the third feature of the present invention.

Effects of the Invention

According to the present invention, it is possible to provide a failure notification system, a failure notification method, a failure notification apparatus, and a failure notification program which can appropriately detect a failure in logical configurations in which a plurality of types of hardware are virtualized in a processor using the logical configurations.

BRIEF DESCRIPTION OF DRAWINGS

FIG. 4 is a diagram illustrating an example of a data configuration of hardware configuration data.

FIG. 6 is a diagram illustrating an example of a data configuration of redundancy type data.

FIG. 7 is a diagram illustrating an example of a data configuration of processor data.

DESCRIPTION OF EMBODIMENTS

Next, embodiments of the present invention will be described with reference to the drawings. In the following drawings, the same or similar reference numbers will be used to refer to the same or similar parts.

(Failure Detection System)

Figure 1:
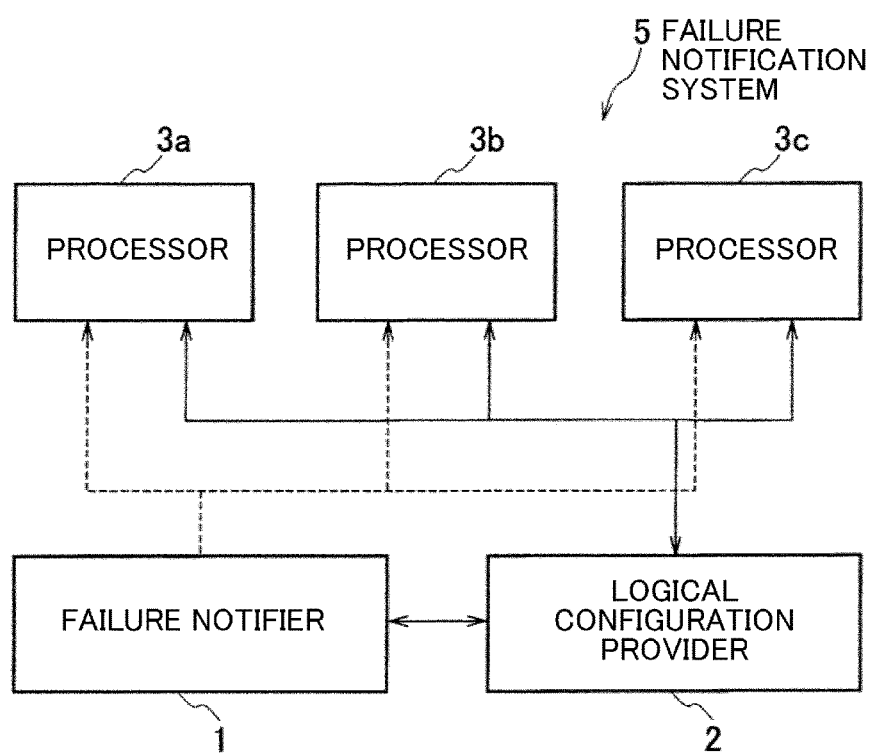
FIG. 1 is a diagram illustrating a system configuration of a failure notification system according to an embodiment of the present invention.

A failure notification system 5 using a failure notifier 1 according to an embodiment of the present invention will be described with reference to FIG. 1. The failure notification system 5 is a system in which a plurality of types of hardware are virtualized. The failure notification system 5 includes a failure notifier 1, a logical configuration provider 2, a first processor 3a, a second processor 3b, and a third processor 3c. In cases where the first processor 3a, the second processor 3b and the third processor 3c are not particularly distinguished, they may be simply referred to as a processor 3.

The failure notifier 1 accesses each type of hardware of the logical configuration provider 2 and notifies the processor 3 of a failure in each type of hardware of the logical configuration provider 2.

The logical configuration provider 2 provides logical configurations in which a plurality of types of hardware are virtualized. The logical configuration provider 2 provides logical configurations from a plurality of types of hardware such as a processing device, a storage device, a communication control device, and a communication link.

The processor 3 is an execution part that executes application programs and uses the logical configurations provided from the logical configuration provider 2.

Figure 2:
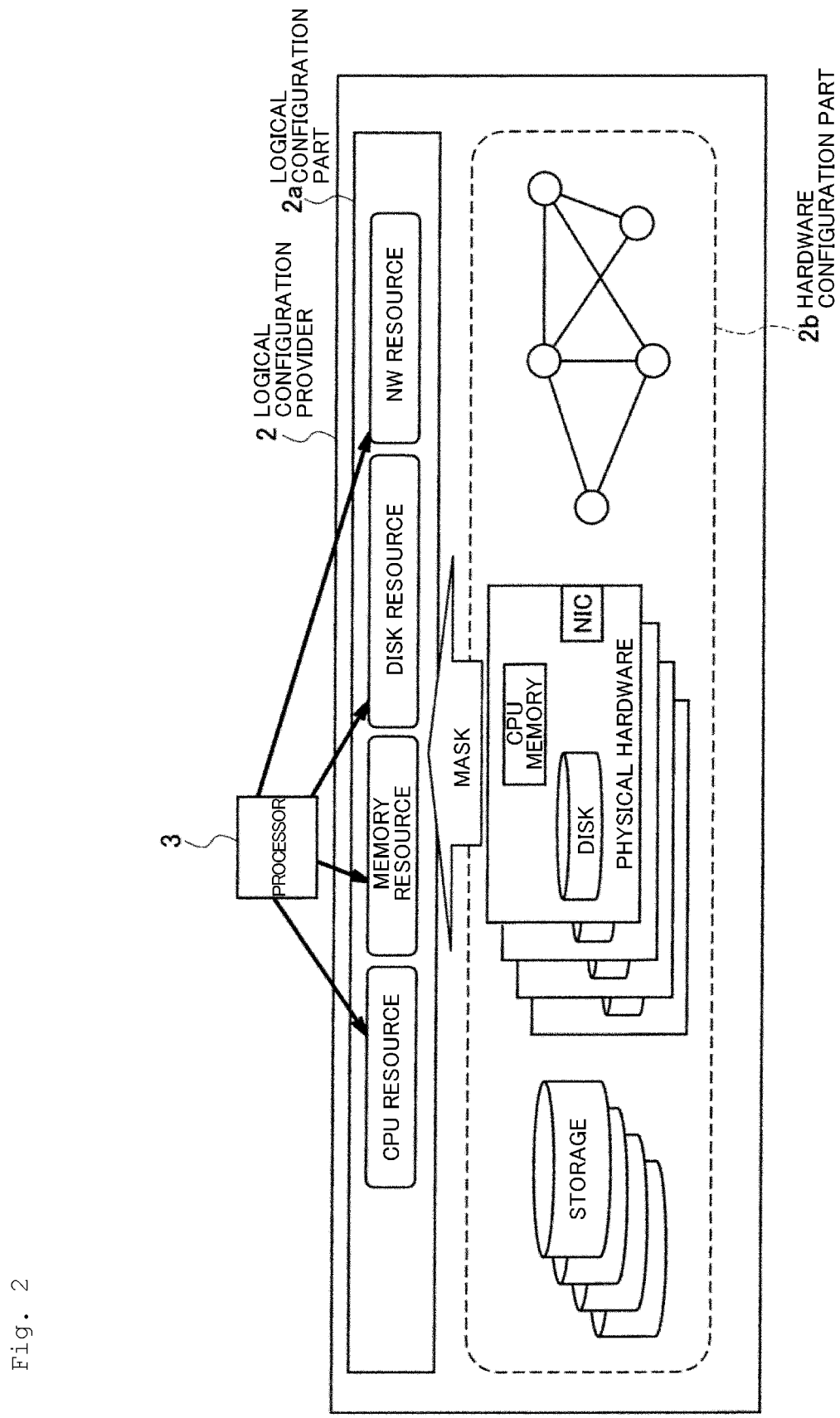
FIG. 2 is a diagram illustrating a relationship between a logical configuration provider and a processor according to an embodiment of the present invention.

A relationship between the logical configuration provider 2 and the processor 3 will be described with reference to FIG. 2. The logical configuration provider 2 includes a logical configuration part 2a and a hardware configuration part 2b. The logical configuration part 2a is a logical configuration provided by the logical configuration provider 2 and includes a CPU resource, a memory resource, a disk resource, a network resource, and the like. The hardware configuration part 2b is physical hardware that is an actual state of each resource of the logical configuration part 2a and includes a disk, a CPU memory, physical hardware including an NIC and the like, a storage (storage device), a communication control device, a network cable, and the like.

The logical configuration provider 2 allocates hardware to resources designated by the processor 3 such that the hardware is used for processing of the processor 3. In addition, the logical configuration provider 2 can appropriately allocate resources necessary for processing of the processor 3 without changing processing of the processor 3 by increasing or decreasing the number of types of hardware allocated to resources designated by the processor 3. In addition, since a hardware configuration is masked for the processor 3, the processor 3 can smoothly perform processing irrespective of hardware substitution even when hardware is substituted due to a failure or the like.

(Failure Notification Apparatus)

Figure 3:
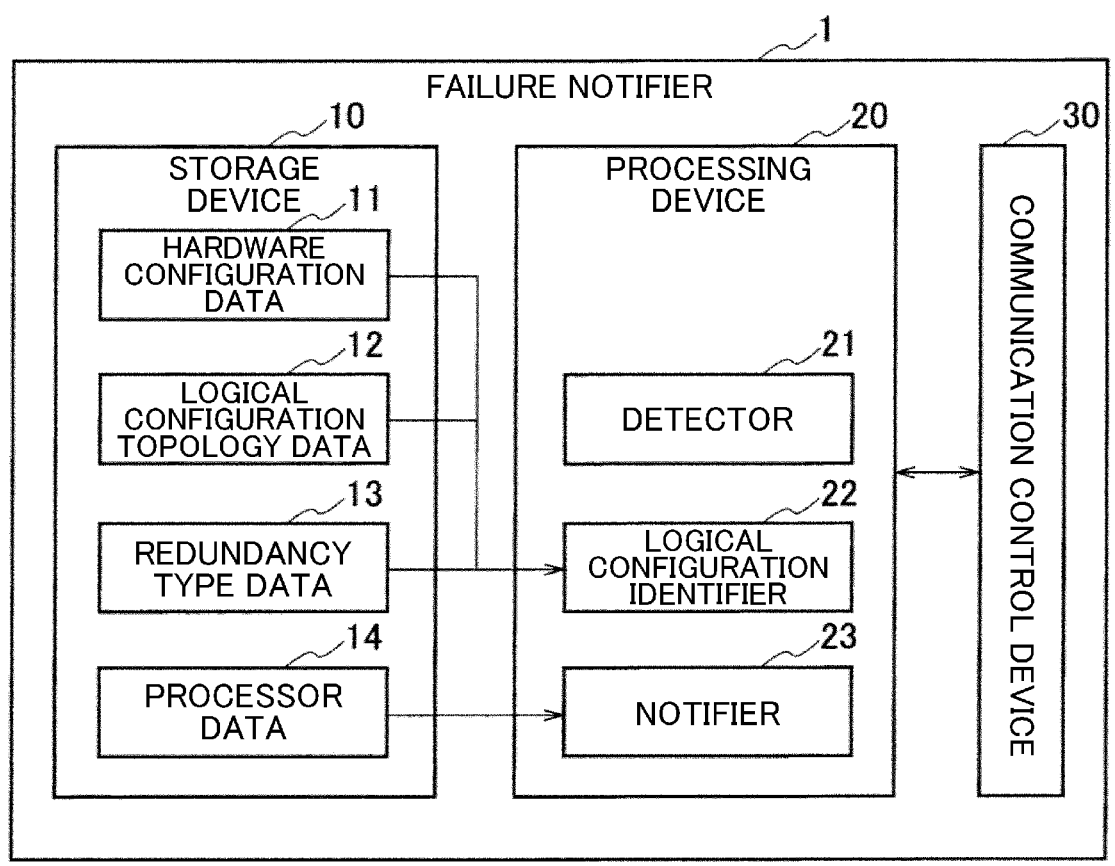
FIG. 3 is a diagram illustrating a hardware configuration and functional blocks of a failure notifier according to an embodiment of the present invention.

The failure notifier (failure notification apparatus) 1 according to an embodiment of the present invention will be described with reference to FIG. 3. The failure notifier 1 can be connected to each type of hardware of the logical configuration provider 2.

The failure notifier 1 includes a storage device 10, a processing device 20, and a communication control device 30. The failure notifier 1 may be a single normal computer or a virtual computer formed of a plurality of types of hardware. The functions illustrated in FIG. 3 are realized by such a computer executing a failure notification program.

The storage device 10 is a read only memory (ROM), a random access memory (RAM), a hard disk, or the like and stores various types data such as input data, output data, and intermediate data used for the processing device 20 to execute processing. The processing device 20 is a central processing unit (CPU) which reads/writes data stored in the storage device 10 or inputs/outputs data to/from the communication control device 30 to execute processing in the failure notifier 1. The communication control device 30 is an interface through which the failure notifier 1 can communicate with other devices and the like.

The storage device 10 stores a failure notification program and also stores hardware configuration data 11, logical configuration topology data 12, redundancy type data 13, and processor data 14.

In the hardware configuration data 11, an ID of hardware included in the logical configuration provider 2 is associated with an ID of a logical configuration corresponding to the hardware, as shown in FIG. 4. When association of each logical configuration of the logical configuration part 2a of the logical configuration provider 2 with each type of hardware of the hardware configuration part 2b is changed or the number of logical configurations or hardware configurations is increased or decreased, the hardware configuration data 11 is updated.

Figure 5:
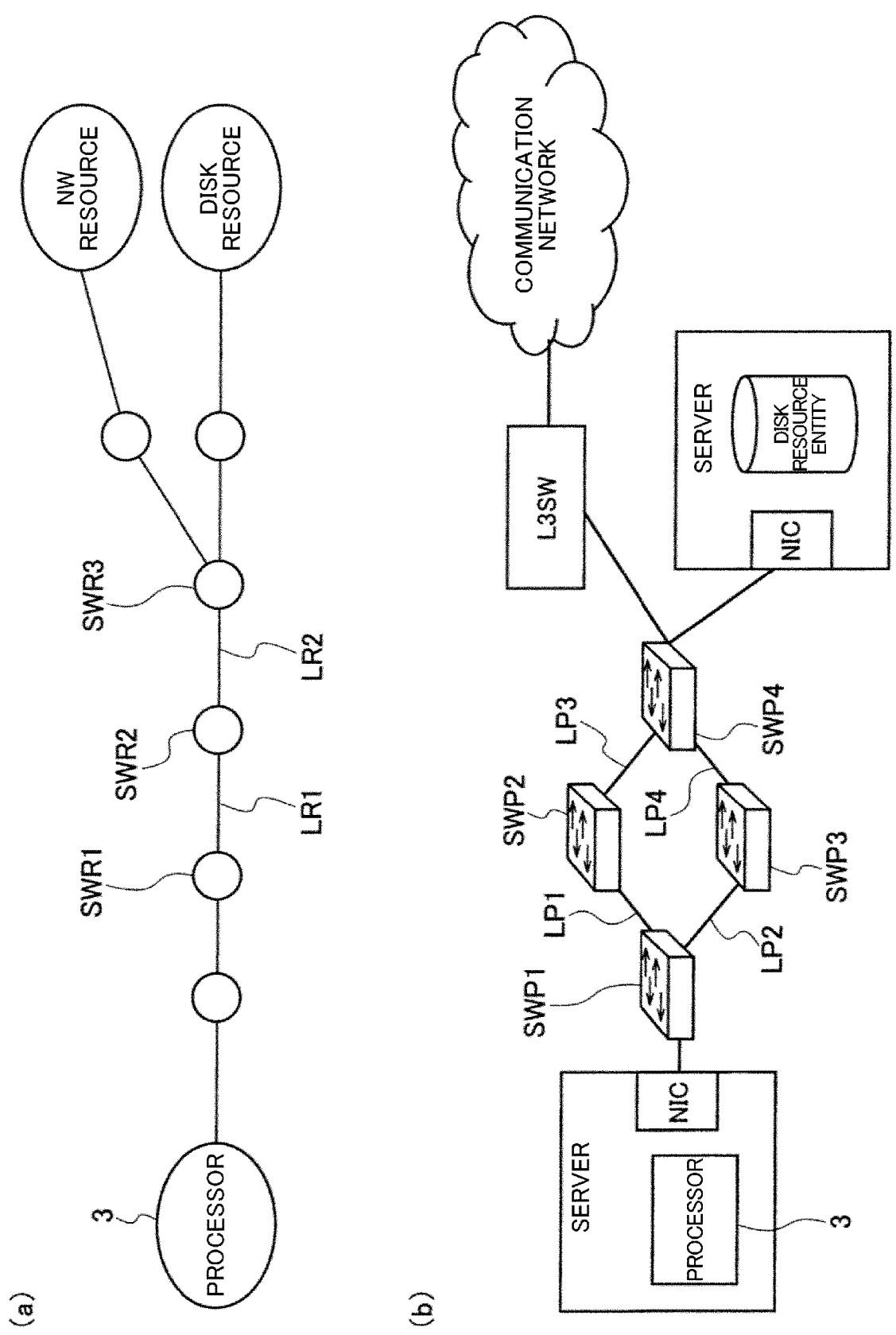
FIG. 5 is a diagram illustrating logical configurations and a hardware configuration of the logical configuration provider.

The logical configuration topology data 12 represents connection states of logical configurations of the logical configuration provider 2, as shown in FIG. 5(*a*). Although FIG. 5(*a*) represents logical configurations as a graph, they may be represented in other forms.

In the redundancy type data 13, an ID of a logical configuration is associated with a redundancy type of the logical configuration. A redundancy type represents presence or absence of redundancy and a redundancy type when there is redundancy.

For example, when a logical configuration is a link between devices, redundancy types are an ACT/SBY configuration, a link aggregation type, and the like. The ACT/SBY configuration represents that systems can be switched even when a failure occurs and the same resources can be provided before and after occurrence of the failure. The link aggregation type represents that a plurality of types of hardware integrally provide a single resource and the amount, quality and the like of resources that can be provided are changed before and after occurrence of a failure. For example, there is a method of unifying a plurality of ports to provide a single link as the link aggregation type. In this method, communication is available in the link even when a failure occurs in one port, but a communication band that can be provided through the link is reduced.

FIG. 5(*b*) shows an example of a hardware configuration topology corresponding to the logical configuration topology shown in FIG. 5(*a*). In the hardware configuration shown in FIG. 5(*b*), an L2 switch SWP2 and an L2 switch SWP3 are provided in parallel between an L2 switch SWP1 and an L2 switch SWP4 in a redundant configuration. Accordingly, in the logical configuration shown in FIG. 5(*a*), the redundancy type data 13 is set to redundancy with respect to a link LR1 between the L2 switch SWR1 and the L2 switch SWR2 and a link LR2 between the L2 switch SWR2 and the L2 switch SWR3.

The link LR1 in FIG. 5(*a*) is a logical configuration of a link LP1 between the L2 switch SWP1 and the L2 switch SWP2 and a link LP2 between the L2 switch SWP1 and the L2 switch SWP3 in FIG. 5(*b*). Likewise, the link LR2 in FIG. 5(*a*) is a logical configuration of a link LP3 between the L2 switch SWP2 and the L2 switch SWP4 and a link LP4 between the L2 switch SWP3 and the L2 switch SWP4 in FIG. 5(*b*). In the hardware configuration shown in FIG. 5(*b*), the redundancy type is set to the ACT/SBY configuration with respect to each of the link LR1 and the link LR2 in the redundancy type data 13 because systems can be switched.

In the processor data 14, an ID of a logical configuration is associated with an ID of the processor 3 using the logical configuration. The processor data 14 is updated in response to a change in the specifications of the processor 3, and the like.

The processing device 20 includes a detector 21, a logical configuration identifier 22 and a notifier 23.

The detector 21 detects presence or absence of a failure with respect to each type of hardware of the hardware configuration part 2b of the logical configuration provider 2. The detector 21 may transmit a command for inquiring of a failure with respect to each type of hardware and detect a failure from the contents of a reply to the command or detect presence or absence of a failure according to notification from hardware. In addition, the detector 21 may transmit a PING command to hardware and detect presence or absence of a failure of the hardware in response to presence or absence of a reply to the PING command as in the conventional technique.

The logical configuration identifier 22 identifies a logical configuration corresponding to hardware from which a failure is detected from hardware configuration data when the detector 21 detects the failure of the hardware. The logical configuration identifier 22 identifies a logical configuration that can be ascertained by the processor 3 with respect to the hardware from which the failure is detected.

Further, the logical configuration identifier 22 identifies a logical configuration influenced by the hardware from which the failure is detected and details of the influence with reference to the logical configuration topology data 12 and the redundancy type data 13. The logical configuration identifier 22 allocates processing in response to presence or absence of redundancy in the logical configuration corresponding to the hardware from which the failure is detected.

When a logical configuration in which a failure occurs is not redundantly formed, the processor 3 cannot use not only the logical configuration in which the failure occurs but also each logical configuration connected to the logical configuration. The logical configuration identifier 22 identifies, as a logical configuration that the processor 3 will be notified of, logical configurations connected to a logical configuration corresponding to hardware from which a failure is detected as a notification target to the processor 3 in addition to the logical configuration corresponding to the hardware from which the failure is detected.

When a logical configuration in which a failure occurs is redundantly formed, details of influence depend on the redundancy type and thus the logical configuration identifier 22 identifies the details of influence in response to the redundancy type.

For example, when the redundancy type is the link aggregation type, since processing can continue but an influence of reducing a band occurs, the logical configuration identifier 22 identifies, as a notification to be sent to the processor 3, details of influence from the influence of reducing the band occurring in addition to the logical configuration corresponding to the hardware from which the failure is detected. In addition, even when the redundancy type is the link aggregation type, the logical configuration provider 2 is influenced as in a case having no redundancy, and thus the logical configuration identifier 22 may additionally identify, as logical configurations that the processor 3 will be notified of, logical configurations connected to the logical configuration corresponding to the hardware from which the failure is detected as a notification target to the processor 3.

On the other hand, when the redundancy type is the ACT/SBY configuration as shown in FIG. 5, systems can be switched even when a failure occurs in a hardware configuration, and thus the logical configuration provider 2 can provide a logical configuration as before the failure. Accordingly, the logical configuration identifier 22 may determine that there is no failure that the processor 3 will be notified of even when the detector 21 detects a failure. In addition, as another example, the logical configuration identifier 22 may determine that the processor 3 will be notified that systems are switched and operated even though a failure occurs in hardware.

The notifier 23 notifies the processor 3 of occurrence of a failure in a logical configuration identified by the logical configuration identifier 22. Further, in cases where processing can continue but an influence of reducing a band or the like occurs, such as a case in which a redundancy type is the link aggregation type, the notifier 23 notifies of details of influence identified by the logical configuration identifier 22. According to such notification, the processor 3 can avoid a hardware failure and take an action such as changing processing.

In addition, the notifier 23 may notify a processor 3 using a logical configuration identified by the logical configuration identifier 22 that a failure occurs in the logical configuration. Accordingly, the notifier 23 notifies only the processor 3 relating to the failure of occurrence of the failure so that a processing load in the failure notification system 5 can be reduced.

A failure notification method in the failure notification system 5 will be described with reference to FIG. 8.

During normal operation, processes of step S1 to step S4 are continuously performed. In step S1, the logical configuration provider 2 presents logical configurations to the processor 3. In step S2, the processor 3 designates a logical configuration presented by the logical configuration provider 2 and requests processing of the logical configuration provider 2. The logical configuration provider 2 performs processing in response to the request from the processor 3 using hardware corresponding to the logical configuration designated by the processor 3 and returns a processing result to the processor 3. In addition, the failure notifier 1 inquires about a failure with respect to each type of hardware of the logical configuration provider 2 in step S3. The failure notifier 1 acquires a failure state of each type of hardware in step S4.

Figure 8:
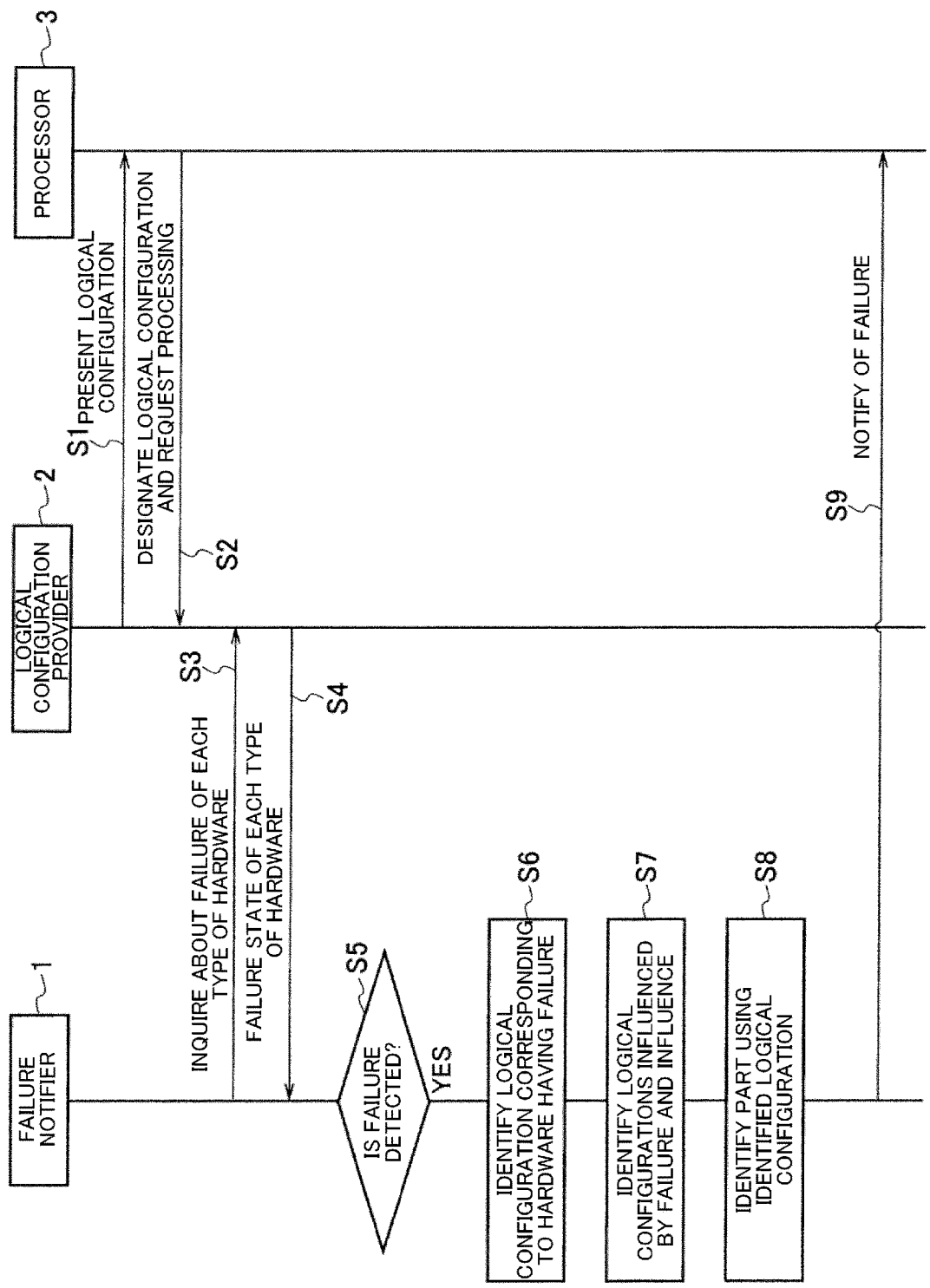
FIG. 8 is a sequence diagram illustrating processing of a failure notification system according to an embodiment of the present invention.

Meanwhile, the order of the processes of step S1 to step S4 is not limited to that shown in FIG. 8. For example, the process of step S1 and step S2 and the process of step S3 and step S4 may be simultaneously performed. In addition, although a case in which the failure notifier 1 inquires of the logical configuration provider 2 about a failure is described in the example shown in FIG. 8, the logical configuration provider 2 may voluntarily notify the failure notifier 1 of a hardware failure.

In step S5, the failure notifier 1 proceeds to step S6 when it is determined that the failure state acquired in step S4 represents a failure. The failure notifier 1 identifies a logical configuration corresponding to the hardware in which a failure occurs in step S6 and identifies logical configurations influenced by the failure and details of the influence in step S7.

In step S8, the failure notifier 1 identifies a processor 3 using the logical configurations identified in step S6 and step S7. In step S9, the failure notifier 1 notifies the processor 3 identified in step S9 of the logical configurations identified in step S6 and step S7 and details of the influence.

As described above, the failure notifier 1 according to an embodiment of the present invention directly inquires of each type of hardware of the logical configuration provider 2 about a failure, acquires a failure state of each type of hardware and notifies the processor 3 of the failure state. In addition, the failure notifier 1 substitutes a failure occurring in hardware of the logical configuration provider 2 with a logical configuration corresponding to the hardware and notifies the processor 3 of the logical configuration. Accordingly, the processor 3 using logical configurations in which a plurality of types of hardware are virtualized can appropriately ascertain a failure in the logical configurations.

Conventionally, it is impossible to comprehensively check whether respective types of hardware have failed because the processor 3 does not ascertain hardware configurations, even if the processor 3 transmits a PING command and can check whether hardware that has received the command has failed. In contrast, the failure notifier 1 according to an embodiment of the present invention can directly inquire of each type of hardware of the logical configuration provider 2 about a failure and acquire a failure state and thus can ascertain a failure state with respect to each type of hardware.

Furthermore, conventionally, while it is checked whether hardware has failed by transmitting the PING command and confirming whether a timeout occurs, there are cases in which time is required from occurrence of a failure to detection thereof, such as waiting until the timeout, and waiting until occurrence of an intermittent failure event. In contrast, in the failure notification system 5 according to an embodiment of the present invention, the processor 3 can immediately ascertain a failure in the logical configuration provider 2 because the failure notifier 1 can notify the processor 3 of details of a failure acquired by directly inquiring of each type of hardware of the logical configuration provider 2 about a failure. In addition, since the failure notifier 1 can acquire a failure state from hardware without depending on a PING command, it is also possible to ascertain a fail soft failure such as suspension of some functions.

Further, the failure notifier 1 identifies logical configurations influenced by a failure that has occurred in hardware and details of the influence with reference to the logical configuration topology data 12 and the redundancy type data 13 and notifies the processor 3 of the identification results. Accordingly, the processor 3 can appropriately cope with a failure in the logical configuration provider 2 in consideration of the failure.

Other Embodiments

Although an embodiment of the present invention has been described above, it should be understood that statement and drawings constituting parts of this disclosure do not limit the present invention. Various substitute embodiments, practical examples and operation technologies will be clear to those skilled in the art from this disclosure.

For example, the failure notifier described in the embodiment of the present invention may be mounted in a single normal computer or mounted in a computer virtually formed of a plurality of types of hardware.

The present invention includes various embodiments and the like that are not described herein. Accordingly, the technical scope of the present invention is limited only by matters used to define the invention according to the claims supported by the above description.

REFERENCE SIGNS LIST

1 Failure notifier
2 Logical configuration provider
2a Logical configuration part
3 Processor
5 Failure notification system
10 Storage device
11 Hardware configuration data
12 Logical configuration topology data
13 Redundancy type data
14 Processor data
20 Processing device
21 Detector
22 Logical configuration identifier
23 Notifier

The invention claimed is:

1. A failure notification system comprising:
a logical configuration provider, including one or more processors, configured to provide logical configurations in which a plurality of types of hardware are virtualized;
a processor using logical configurations provided from the logical configuration provider; and
a failure notifier configured to notify the processor of a failure in the logical configuration provider, wherein the failure notifier comprises:
a storage device configured to store hardware configuration data in which an ID of the hardware is associated with an ID of a logical configuration corresponding to the hardware, logical configuration topology data representing connection states of the logical configurations, and redundancy type data in which IDs of the logical configurations are associated with redundancy types of the logical configurations, wherein the redundancy types of one or more logical configurations respectively corresponding to one or more device links include an ACT/SBY configuration type indicating that same resources can be provided through the device link before and after occurrence of a failure, or a link aggregation type indicating that quality of resources provided through the device link are changed before and after occurrence of a failure;
a detector, including one or more processors, configured to transmit a PING command to each type of hardware virtualized by the logical configuration provider;
a logical configuration identifier, including one or more processors, configured to identify a logical configuration corresponding to hardware from which a failure is detected from the hardware configuration data when a failure in the hardware is detected based on an absence of a reply to the PING command sent by the detector, and identify logical configurations influenced by the hardware from which the failure is detected and details of the influence with reference to the logical configuration topology data and the redundancy type data; and
a notifier, including one or more processors, configured to notify the processor of occurrence of a failure in the logical configuration identified by the logical configuration identifier;
wherein the notifier is further configured to notify the processor of the identified details of the influence based on the redundancy type data, comprising:
in response to the redundancy type of the identified logical configuration being the link aggregation type, notifying the processor of an influence of a reduced communication band; and
in response to the redundancy type of the identified logical configuration being the ACT/SBY type, notifying the processor that the hardware in the identified logical configuration has switched.

2. The failure notification system according to claim 1, wherein
the storage device is further configured to store processor data in which the IDs of the logical configurations are associated with IDs of processors using the logical configurations, and
the notifier is configured to notify a processor using a logical configuration identified by the logical configuration identifier of occurrence of a failure in the logical configuration.

3. A failure notification method used in a failure notification system including: a logical configuration provider, including one or more processors, configured to provide logical configurations in which a plurality of types of hardware are virtualized; a processor using logical configurations provided from the logical configuration provider; and a failure notifier, including one or more processors, configured to notify the processor of a failure in the logical configuration provider, the failure notification method comprising:
storing by a computer, in a storage device, hardware configuration data in which an ID of the hardware is associated with an ID of a logical configuration corresponding to the hardware, logical configuration topology data representing connection states of the logical configurations, and redundancy type data in which IDs of the logical configurations are associated with redundancy types of the logical configurations, wherein the redundancy types of one or more logical configurations respectively corresponding to one or more device links include an ACT/SBY configuration type indicating that same resources can be provided through the device link before and after occurrence of a failure, or a link aggregation type indicating that quality of resources provided through the device link are changed before and after occurrence of a failure;
transmitting, by the computer, a PING command to each type of hardware virtualized by the logical configuration provider;
identifying, by the computer, a logical configuration corresponding to hardware from which a failure is detected from the hardware configuration data when a failure in the hardware is detected based on an absence of a reply to the PING command sent by the computer, and identifying logical configurations influenced by the hardware from which the failure is detected and details of the influence with reference to the logical configuration topology data and the redundancy type data;
notifying, by the computer, the processor of occurrence of a failure in the logical configuration identified in the identifying step; and
notifying the processor of the identified details of the influence based on the redundancy type data, comprising:
in response to the redundancy type of the identified logical configuration being the link aggregation type, notifying the processor of an influence of a reduced communication band; and in response to the redundancy type of the identified logical configuration being the ACT/SBY type, notifying the processor that the hardware in the identified logical configuration has switched.

4. A failure notification apparatus serving as a failure notifier in a failure notification system including: a logical configuration provider configured to provide logical configurations in which a plurality of types of hardware are virtualized; a processor using logical configurations provided from the logical configuration provider; and the failure notifier configured to notify the processor of a failure in the logical configuration provider, the failure notification apparatus comprising:

a storage device configured to store hardware configuration data in which an ID of the hardware is associated with an ID of a logical configuration corresponding to the hardware, logical configuration topology data representing connection states of the logical configurations, and redundancy type data in which IDs of the logical configurations are associated with redundancy types of the logical configurations, wherein the redundancy types of one or more logical configurations respectively corresponding to one or more device links include an ACT/SBY configuration type indicating that same resources can be provided through the device link before and after occurrence of a failure, or a link aggregation type indicating that quality of resources provided through the device link are changed before and after occurrence of a failure;

a detector, including one or more processors, configured to transmit a PING command to each type of hardware virtualized by the logical configuration provider;

a logical configuration identifier, including one or more processors, configured to identify a logical configuration corresponding to hardware from which a failure is detected from the hardware configuration data when a failure in the hardware is detected based on an absence of a reply to the PING command sent by the computer, and identify logical configurations influenced by the hardware from which the failure is detected and details of the influence with reference to the logical configuration topology data and the redundancy type data; and a notifier, including one or more processors, configured to notify the processor of occurrence of a failure in the logical configuration identified by the logical configuration identifiers;

wherein the notifier is further configured to notify the processor of the identified details of the influence based on the redundancy type data, comprising:

in response to the redundancy type of the identified logical configuration being the link aggregation type, notifying the processor of an influence of a reduced communication band; and in response to the redundancy type of the identified logical configuration being the ACT/SBY type, notifying the processor that the hardware in the identified logical configuration has switched.

5. A non-transitory computer readable medium storing the failure notification program for causing a computer to serve as the failure notification apparatus according to claim 4.

6. The failure notification method according to claim 3, further comprising:

storing, by the computer, in the storage device, processor data in which the IDs of the logical configurations are associated with IDs of processors using the logical configurations; and notifying, by the computer, a processor using a logical configuration identified by the logical configuration identifier of occurrence of a failure in the logical configuration.

7. The failure notification apparatus according to claim 4, wherein:

the storage device is further configured to store processor data in which the IDs of the logical configurations are associated with IDs of processors using the logical configurations, and the notifier is configured to notify a processor using a logical configuration identified by the logical configuration identifier of occurrence of a failure in the logical configuration.

* * * * *